UNITED STATES PATENT OFFICE.

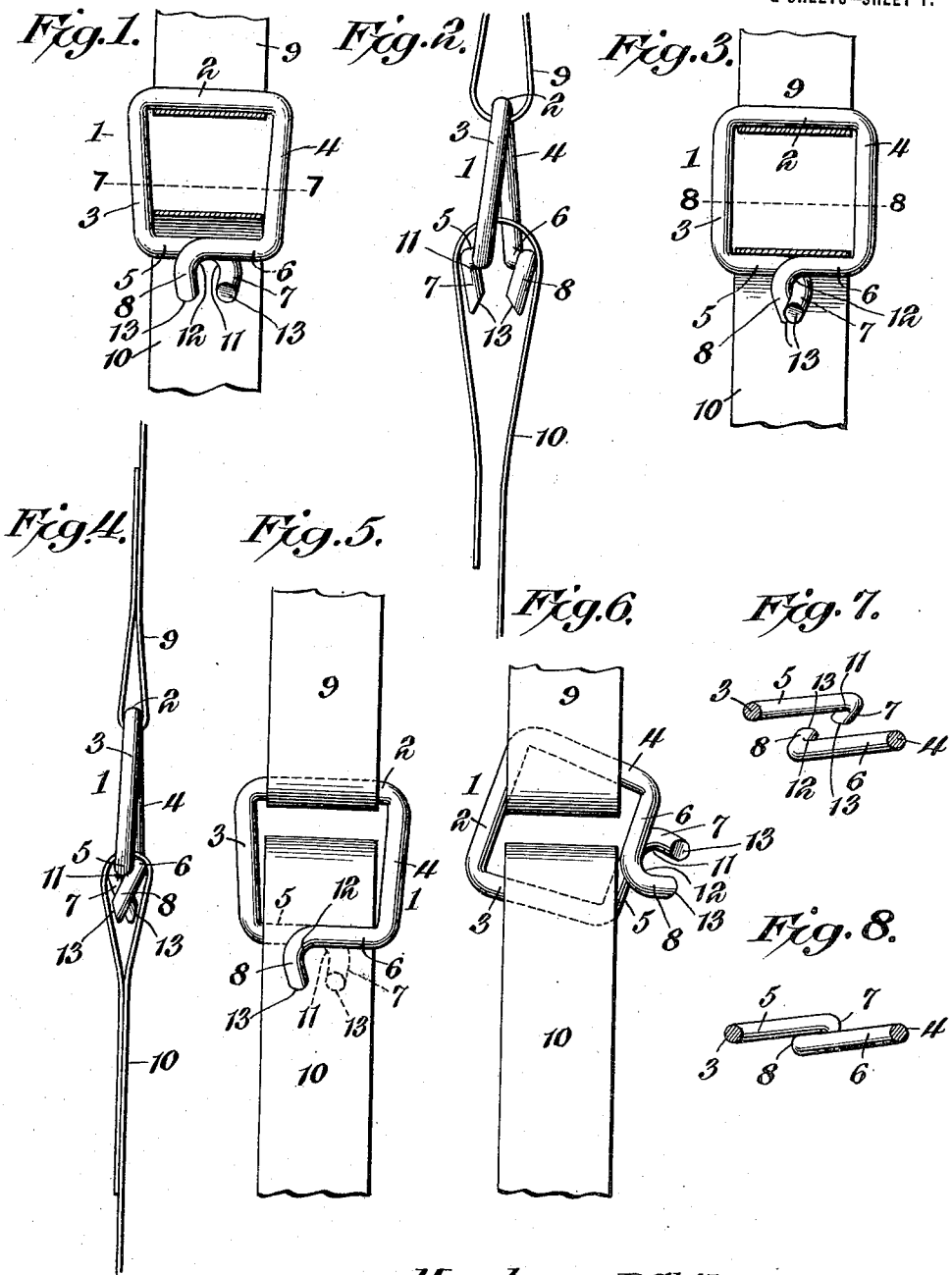

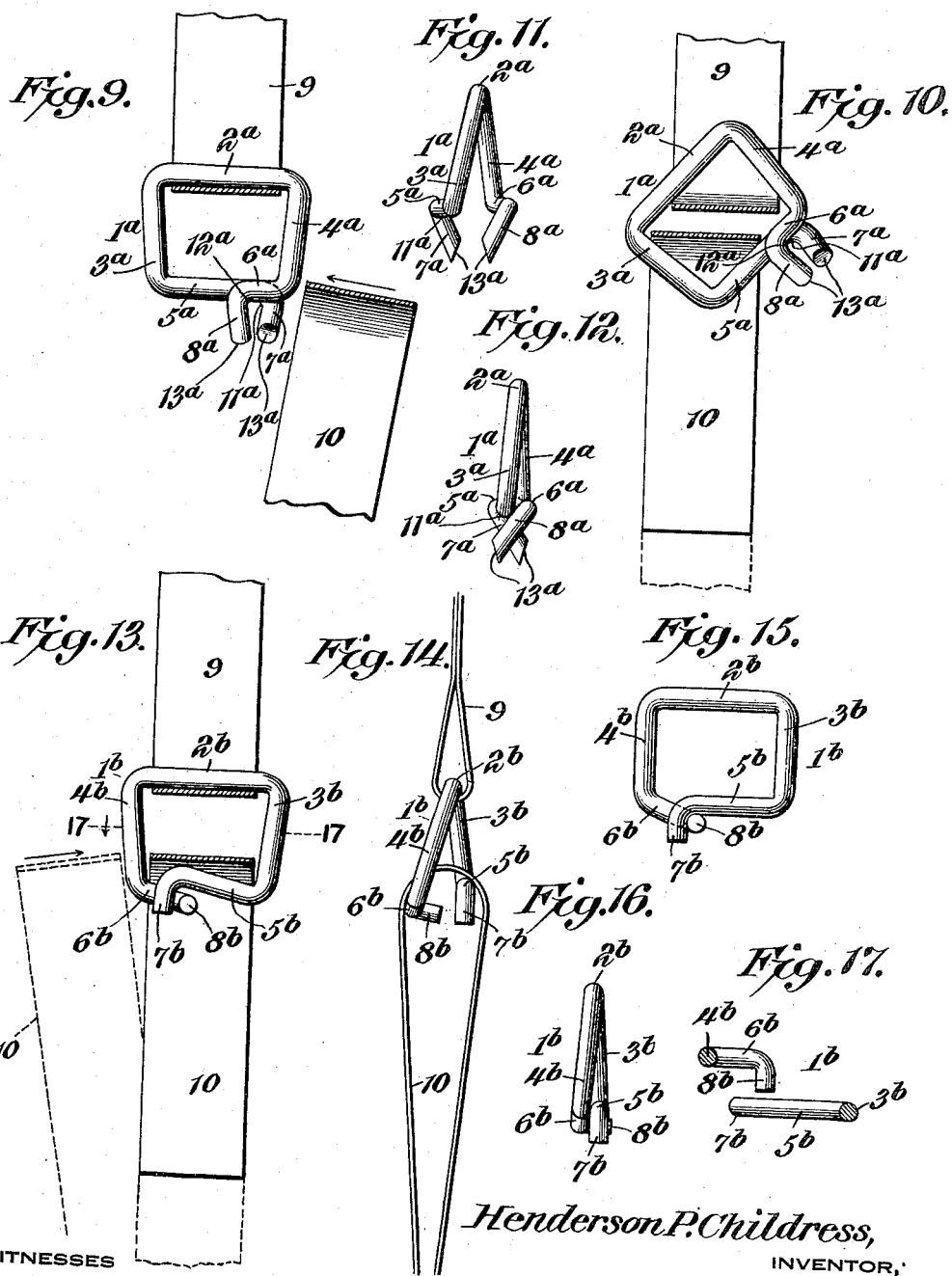

HENDERSON P. CHILDRESS, OF MEMPHIS, TENNESSEE, ASSIGNOR TO COTTON BUCKLE AND TAG CO., INC., OF MEMPHIS, TENNESSEE, A CORPORATION OF TENNESSEE.

BALE-BUCKLE.

1,219,702.

Specification of Letters Patent.

Patented Mar. 20, 1917.

Application filed May 20, 1916. Serial No. 98,901.

*To all whom it may concern:*

Be it known that I, HENDERSON P. CHILDRESS, a citizen of the United States, residing at Memphis, in the county of Shelby and State of Tennessee, have invented a new and useful Bale-Buckle, of which the following is a specification.

This invention has reference to bale buckles and its object is to provide a buckle to which the bale band may be quickly applied, which may be made of relatively light stock, and which will not pull out even when used in connection with high density cotton bales.

In accordance with the present invention the buckle consists of a single piece of wire of suitable gage bent into the form of a loop, which may be of generally rectangular shape, and comprising two side bars and two end bars. The entering end of the buckle comprises one of the end bars made up of the free ends of the wire having their extremities bent into initially separated hooks extending substantially perpendicular to the plane of the body of the buckle, said hooks overlapping. The hooks are bent in a direction away from the body of the buckle but toward each other and also toward the plane of the body of the buckle, or they may be bent toward each other without being also bent toward the plane of the body of the buckle. In either case they are in position to overlap and interlock when pressure is exerted on them by the loop of the bale band encircling the entering end of the buckle. The engaging movement of the hooks is such as to cause the hooks to move laterally one toward the other and then in the direction of the length of the entering end bar of the buckle, and the structure is such that when the hooks are interlocked they are also contained entirely within the corresponding looped end of the bale band.

The interlocking and certain other features of the invention are susceptible of union with non-rendering structures, but such a non-rendering buckle is neither shown nor claimed herein, since it forms the subject-matter of another application for a bale buckle filed by me on even date herewith.

The invention will be best understood from a consideration of the following detailed description taken in connection with the accompanying drawings forming part of this specification, with the further understanding that while the drawings show a practical embodiment of the invention, the latter is not confined to any strict conformity with the showing of the drawings, but may be changed and modified so long as such changes and modifications come within the scope of the appended claims.

In the drawings:—

Figure 1 is an elevation of one form of the bale buckle of the present invention with the bale band applied, but having the loops in cross-section.

Fig. 2 is an edge view of the arrangement of Fig. 1 as seen from one side of Fig. 1.

Fig. 3 is a view similar to Fig. 1 but showing the buckle pulled; that is, the position of the parts under the action of the expansive force of the bale.

Fig. 4 is an edge view of the structure of Fig. 3.

Fig. 5 is a view similar to Fig. 1 showing one step in the application of the second loop of the bale band to the buckle.

Fig. 6 is a view similar to Fig. 5 but showing a succeeding step in the application of the bale band to the buckle.

Fig. 7 is a section on the line 7—7 of Fig. 1, but omitting the bale band.

Fig. 8 is a section on the line 8—8 of Fig. 3, but omitting the bale band.

Fig. 9 is an elevation of a somewhat different form of buckle from Fig. 1, but containing the same interlocking features, and showing the second loop of the bale band about to be introduced into the entering end of the buckle.

Fig. 10 is a view of the buckle of Fig. 9 illustrating a step in the application of the second loop of the bale band of the buckle.

Fig. 11 is an edge view of the buckle of Fig. 9.

Fig. 12 is a view similar to Fig. 11 but showing the buckle pulled.

Fig. 13 is a side elevation of still another form of buckle embodying the invention, showing the buckle in the initial condition and the band applied and also indicating the direction of movement of the second loop of the band into the buckle.

Fig. 14 is an edge view of the structure of Fig. 13 as viewed from the left hand side thereof.

Fig. 15 is an elevation of the buckle of Fig. 13 after being pulled.

Fig. 16 is an edge view of the buckle shown in Fig. 15.

Fig. 17 is a section on the line 17—17 of Fig. 13 with the bale band omitted.

Referring to the drawings, and considering first the arrangement shown in Figs. 1 to 8, there is shown a buckle 1 comprising a single piece of wire bent into an intermediate straight portion constituting one end bar 2, and then at the ends of the intermediate portion into corresponding side bars 3, 4, respectively, and at the ends of the side bars remote from the end bar 2 into approaching portions 5, 6, terminating in angle or hook extremities 7, 8, respectively. The end portions 5 and 6 with their hook extensions or extremities 7 and 8 constitute the other end bar of the buckle and form the entering end of the buckle, these extensions 5 and 6 being spaced apart on opposite sides of the plane of the body of the buckle, so as to leave room between them for the entrance of the corresponding looped end of the bale band.

It is customary to form one end of the bale band into a loop and apply the buckle thereto at the bench, so that such end of the bale band, indicated at 9, may be designated the bench-applied loop of the bale band. After the bale of cotton has been placed in the compress and pressed to the desired extent, the bale band is applied in the usual manner, and that end remote from the buckle is formed into a loop indicated at 10. Such loop 10 is threaded through the entering end of the buckle, and the latter is appropriately turned, so that the loop 10 may be placed into proper relation to the second end bar forming the entering end of the buckle, after which the pressure upon the bale is released to cause the parts of the buckle to be properly positioned to secure the two looped ends of the bale band together.

If a buckle such as indicated in Fig. 1 and associated figures be viewed from one edge, the side bars will be seen to diverge from the end bar 2 toward the other end bar at the entering end of the buckle, and the extensions 5 and 6 with their hooked extremities 7 and 8 will be seen to be separated on opposite sides of the mid plane of the body of the buckle sufficiently to permit the threading of the loop 10 on to the buckle through the entering end thereof.

The hooks 7 and 8 are bent both toward the intermediate plane of the body of the buckle and toward each other, so that when brought together the free ends of the hooks will engage about and interlock one with the other with the throats of the hooks, indicated at 11 and 12, respectively, in close engagement, and the free ends of the hooks each partially embracing the corresponding free end of the other hook, such condition being best shown in Figs. 3, 4 and 8.

In the initial condition of the buckle the two members of the second end bar made up of the parts 5, 6, 7 and 8 are spaced apart sufficiently so that when the loop 10 is applied it is threaded over the extension 5 and hook 8 back of the extension 6 and hook 7 as indicated in Fig. 5. Then the buckle is turned so that the extension 6 and hook 7 are carried beyond the corresponding edge of the loop 10, and the hook 7 and extension 6 are threaded into the loop so that under such conditions both extensions 5 and 6 constituting the second end bar of the buckle and both hooks 7 and 8 are inside of the loop 10, as shown in Fig. 2, but the extensions 5 and 6 and hooks 7 and 8 are still spread apart.

Upon release of pressure upon the bale the latter expands and tends to pull the loops 9 and 10 away one from the other. The first effect of this is to flatten the loop 10 and press or squeeze the extensions 5 and 6 toward each other and the hooks 7 and 8 also toward each other in a direction laterally of the length of the buckle and bale band. This action causes the extensions 5 and 6 to come into engagement, whereupon further approach of the extensions is, of course, arrested, but the expansive force of the bale is still exerted tending to flatten out the loops 9 and 10, and this tends to pull out the buckle by drawing the extensions 5 and 6 away from the end bar 2, with the result that the hooks 7 and 8 are then drawn toward each other, so that the oppositely bent extremities of these hooks lock one behind the other and the throats 11 and 12 come into engagement. The forces tending to pull the extensions 5 and 6 away from the end bar 2 are therefore resolved into forces tending to move the extensions 5 and 6 lengthwise of each other, but such forces are resisted by the engaging throats of the hooks 7 and 8, and the interlocking of the extremities of these hooks effectively resists any tendency to pull the hooks apart in the direction of the length of the extensions 5 and 6. This is because the forces tending to pull the extensions 5 and 6 lengthwise of each other are exerted close to the roots of the hooks 7 and 8, wherefore no force short of one destructive to the buckle or bale band can be exerted in a direction to pull out such end bar of the buckle and thus release the bale band loop 10.

Moreover, the hooks are further prevented from moving away one from the other in a direction perpendicular to the mid plane of the body of the buckle by the sides of the loop 10, since this loop completely embraces the hooks 7 and 8 in their interlocking condition. The bulge due to the presence of the interlocking hooks 7 and 8 and acting upon the two side members of the loop 10 of the bale band contributes toward preventing rendering of the tucked-in end of the loop 10, because such bulging would necessitate some distortion of the loop 10 highly resistant to any rendering action.

To prevent any liability of the sides of the loop 10 of the bale band from separating the interlocked hooks in a direction perpendicular to the mid plane of the plane of the body of the buckle, the extremities of the hooks may be beveled, as indicated at 13, so that when the parts are pulled, as occurs when the banded bale is released from the compress, the extensions 5 and 6 and the hooks 7 and 8 remain in firm side by side engagement.

The buckle is susceptible of quick and easy application with little or no liability of misapplication even under the stress of rapid work at the compress.

The interlocking of the two parts of the end bar constituting the entering end of the buckle occurs within the corresponding loop 10 of the bale band, wherefore such loop contributes toward the holding of the interlocking members or hooks in the interlocked condition against any possibility of disengagement by pulling out or apart. For this reason the buckle may be made of relatively light stock which were the interlocking hooks placed elsewhere than in position to be imprisoned by the bale applied loop of the buckle would be too light to safely withstand the great strain under which the buckle is placed by the expansive forces of the bale. Consequently, the number of buckles to the pound of stock is materially increased.

The present invention is practically advantageous in connection with high density cotton where the expansive force of the bale due to the high compression and consequent small height of the bale is particularly great. With the present invention the resistance of the entering end of the buckle to forces tending to pull it apart is such that the buckle will effectively withstand any strains which may be placed upon it short of strains which will cause other parts of the buckle to pull apart or break.

In the structure shown in Figs. 9 to 12 the parts of the buckle already described with reference to Fig. 1 and associated figures are designated by the same reference numerals except that they are accompanied by the exponent "$a$."

The buckle $1^a$ is in most respects similar to the buckle 1, except that the buckle 1 is approximately square in shape while the buckle $1^a$ is shorter than wide. Moreover, while the buckle $1^a$ has the extensions 5 and 6 of approximately equal length, the extension $5^a$ of the buckle $1^a$ is considerably longer than the extension $6^a$, wherefore the hooks $7^a$ and $8^a$ are located nearer to one side bar, say, the side bar $4^a$, than to the other side bar. In the structure of Fig. 1 the hooks 7 and 8 are located about equal distances from the respective side bars.

The operation of interlocking and the effect of the interlocking of the hooks $7^a$ and $8^a$ are the same as in Fig. 1, but the buckle $1^a$ has the advantage of greater ease of application of the bale band loop 10 and the impossibility of applying the bale band so that it might be left with the two loops 9 and 10 on the side bars instead of on the end bars. This is due to the length of the buckle being less than the width of the bale band, wherefore the buckle cannot be given as much as a quarter of a revolution on the bale band after the loop 10 is threaded into the buckle, so that should the buckle be left in the improper position it will actually tend to assume the proper position when subjected to the expansive effect of the bale. There is little chance, however, of the buckle being left in such improper position because the operator would at once notice the unusual position of the buckle, while, should the buckle be turned so that the bale band loops engage the side bars instead of the end bars, such improper positioning of the buckle would be far less noticeable and might escape immediate attention.

The buckle of Fig. 9 and associated figures is to be preferred to the buckle of Fig. 1 and associated figures because of the ease of application of the bale band thereto and the minimum amount of turning movement of the buckle to introduce the short extension $6^a$ with its hook $7^a$ into the loop 10 after the latter has been threaded upon the longer extension $5^a$ and hook $8^a$.

In the structure shown in Figs. 13 to 17 the idea of interlocking the two members making up the second end bar and inclosing or imprisoning the interlocked portions in the corresponding loop of the bale band occurs.

In Fig. 13 and associated figures the description of the buckle of Fig. 1 and associated figures in the main applies, and the same reference numerals are used, except that they are accompanied by the exponent "$b$." The hook $7^b$ is, however, at approximately right angles to the extension $5^b$ and projects in a direction away from the body of the buckle and from the end bar $2^b$, while the hook $8^b$ projects at approximately right angles to the extension $6^b$ and approximately perpendicular to the mid plane of the body of the buckle.

In the several forms of buckle the side and end bars are bent so that their joining ends meet on the interior of the buckle in angular relation and the side edges of the band are not bent or crimped. Consequently there is no liability of so weakening the band as to cause it to tear, especially under the great expansive force of a bale of high density cotton.

What is claimed is:—

1. A one piece wire bale buckle comprising an end bar, two side bars, and extensions of each side bar directed toward the other side bar into overlapping relation and spaced apart laterally of the buckle, such extensions each terminating in a hook directed away from the end bar and on the side of the other hook toward the end bar to which said other hook is connected, said hooks being movable toward each other by the loop of an applied bale band into interlocking engagement with the interlocked hooks within the said loop of the bale band.

2. A one-piece wire bale buckle, comprising an end bar, two side bars, and a second end bar formed of extensions of the side bars and terminating between the side bars in hooks adapted to interlock and initially separated to provide an entrance to the buckle for the bale band.

3. A one-piece wire bale buckle, comprising an end bar, two side bars, and a second end bar formed of overlapping extensions of the respective side bars terminating in hooks bent in a direction away from the first-named end bar and also toward each other and toward the side bars carrying the corresponding extensions, said hooks being located to be inclosed by the looped end of a bale band applied to the buckle about the second-named end bar to be pressed toward each other and drawn into interlocking engagement by the loop of the bale band under the expansive force of the bale.

4. A one-piece wire bale buckle having an entering end composed of overlapped ends of the piece of wire terminating in hooks extending away from the interior of the buckle and separated one from the other toward respective sides of the buckle, said hooks having their extremities directed one toward the other, whereby the hooks on being moved first laterally and then longitudinally into engagement mutually embrace and interlock with each other, said hooks being so located with respect to the sides of the buckle as to be inclosed by a loop of a bale band extending about the entering end thereof.

5. A one-piece wire bale buckle, having an entering end adapted to receive and be embraced by a loop of an applied bale band, said entering end comprising overlapping terminal portions of the piece of wire each ending in a hook exterior to the buckle, with the free ends of the hooks initially closer together than the throats of the hooks both in the direction of the length and width of the buckle, with the hooks and the ends of the wire of which they are formed initially separated to permit the threading of the loop of the bale band into the buckle and said hooks being so located with respect to the sides of the buckle as to be inclosed by the applied bale band for movement toward each other into side engagement and then into interlocking engagement in order by the expansive force of the bale exerted upon the overlapping ends of the wire at the entering end of the buckle through the bale band.

6. A one-piece wire bale buckle of less length than width, with the length less than the width of the bale band for which the buckle is provided, said buckle having an entering portion adapted to be embraced by a looped end of the bale band and formed by overlapping ends of the wire initially spaced apart perpendicular to the direction of overlapping, said ends of the wire each terminating in a hook exterior to the entering end of the buckle and so related to the sides of the buckle as to be inclosed by the loop of the applied bale band and the hooks being bent so as to interlock when brought into engagement by progressively applied compressive and extensive forces due to the action of the expansion of the bale upon the bale band.

7. A one-piece wire bale buckle having an end bar constituting the entering end of the buckle and formed of overlapping ends of the wire initially spaced apart in the direction of the width of the buckle and also in a direction perpendicular thereto with the extremities of said ends formed into hooks correspondingly spaced apart and having their free ends approaching, said hooks being exterior to the body of the buckle and arranged closer to one side of the body of the buckle than the other and situated with relation to the sides of the buckle to be inclosed by the looped end of an applied bale band introduced through the open end of the buckle, whereby the hooked ends of the wire constituting the entering end bar of the buckle respond first to compressive forces applied to the looped end of the bale band and then to extensive forces bringing the hooks toward each other into interlocking engagement within the applied loop of the bale band.

8. A one-piece wire bale buckle having an end bar constituting the entering end of the buckle and formed of overlapping ends of the wire initially spaced apart in the direction of the width of the buckle and also in a direction perpendicular thereto with the extremities of said ends formed into hooks correspondingly spaced apart and having their free ends approaching, said hooks being exterior to the body of the buckle and arranged closer to one side of the body of the buckle than the other and situated with relation to the sides of the buckle to be inclosed by the looped end of an applied bale band introduced through the open end of the buckle, whereby the hooked ends of the wire constituting the entering end bar of the buckle respond first to compressive forces applied by the loop of the bale band and then to extensive forces bringing the hooks into interlocking engagement within the applied looped end of the bale band, said buckle being of greater width than length with the length less than the width of the bale band with which the buckle is associated.

9. A one-piece wire bale buckle, comprising an end bar, two side bars, and a second end bar with the latter formed of extensions of the side bars shorter than the first-named end bar and directed one toward the other, each of said side extensions terminating in a portion extending lengthwise of an applied bale band, the said extensions and their terminal portions being initially spaced apart laterally of the length of the applied bale band to constitute the entering end of the buckle, and said terminal portions overlapping and movable on the approach of the extensions under side pressure of the applied bale band into interlocking engagement.

10. A one-piece bale buckle, comprising an end bar, two side bars and a second end bar formed of approaching extensions of the side bars shorter than the first-named end bar and having their terminal portions overlapping and shaped to interlock, said extensions and their terminal portions being initially separated to provide an entrance to the buckle for the bale band.

In testimony that I claim the foregoing as my own, I have hereto affixed my signature in the presence of two witnesses.

HENDERSON P. CHILDRESS.

Witnesses:
JOHN H. SIGGERS,
MARIE L. LEWIS.